United States Patent [19]

Kisslan

[11] 3,937,588
[45] Feb. 10, 1976

[54] EMERGENCY CONTROL SYSTEM FOR GAS TURBINE ENGINE VARIABLE COMPRESSOR VANES

[75] Inventor: John H. Kisslan, Jupiter, Fla.

[73] Assignee: United Technologies Corporation, Hartford, Conn.

[22] Filed: July 24, 1974

[21] Appl. No.: 491,421

[52] U.S. Cl. ............... 415/17; 415/32; 415/48; 60/223; 60/39.29
[51] Int. Cl.² .................................... F01B 25/00
[58] Field of Search .............. 415/17, 32, 36, 48; 60/39.29, 223

[56] References Cited
UNITED STATES PATENTS

| | | |
|---|---|---|
| 2,950,857 | 8/1960 | Williams et al. .............. 60/39.29 |
| 3,367,565 | 2/1968 | Urban .............................. 415/17 |
| 3,814,537 | 6/1974 | Stoltman ........................ 415/36 |

*Primary Examiner*—C. J. Husar
*Attorney, Agent, or Firm*—Donald F. Bradley

[57] ABSTRACT

A gas turbine engine has variable vanes in the rear compressor that are automatically scheduled to their optimum position for proper engine operation by a closed loop primary engine control system in response to selected engine operating conditions. A failure in the engine control system may cause the variable vanes to be locked in a position which degrades the engine aerodynamics to a dangerous level. An emergency controller is connected to schedule the position of the variable compressor vanes in an open loop manner in response to changes in the power lever when a failure of the primary engine control system occurs.

6 Claims, 2 Drawing Figures

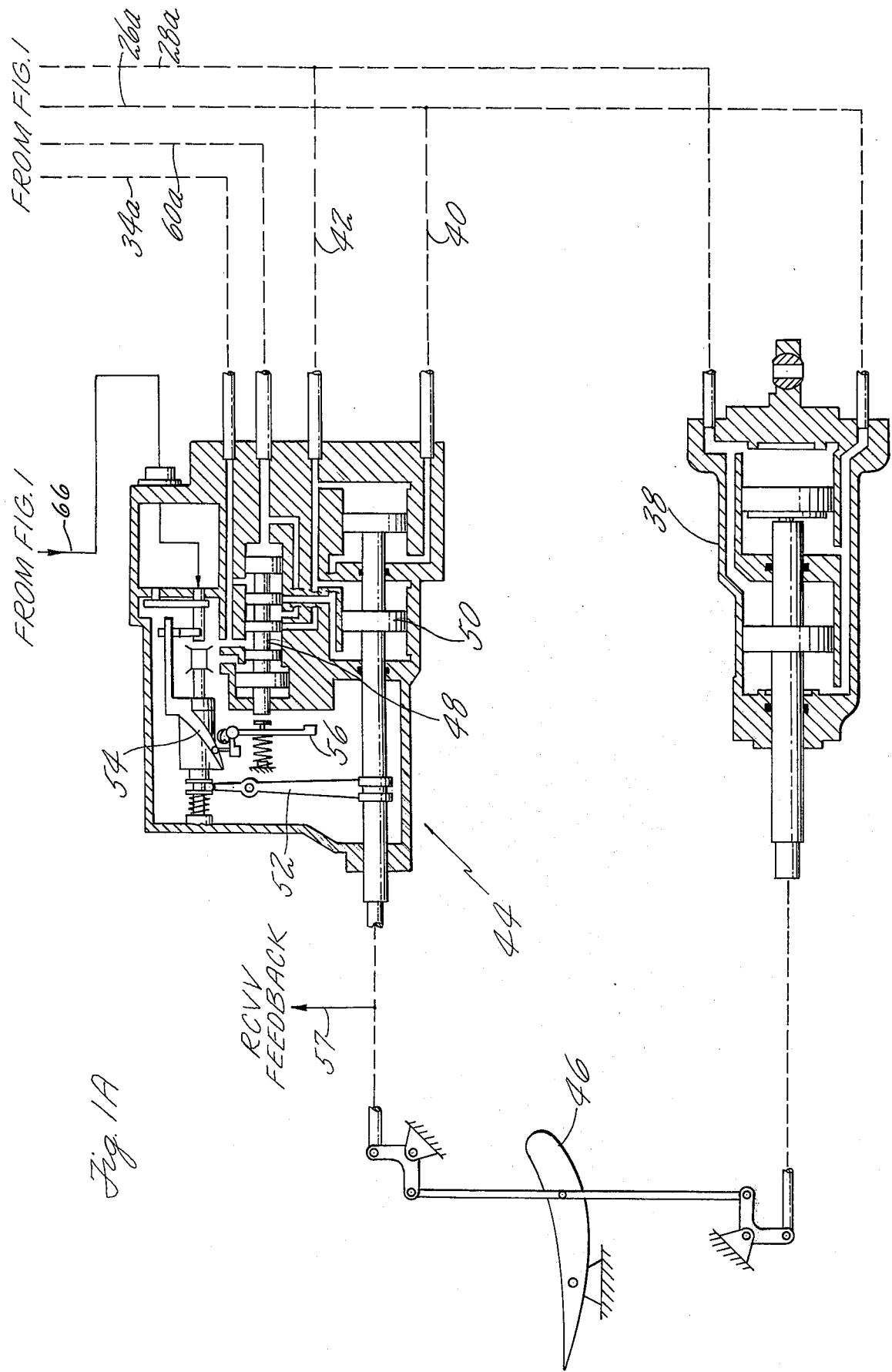

3,937,588

EMERGENCY CONTROL SYSTEM FOR GAS TURBINE ENGINE VARIABLE COMPRESSOR VANES

BACKGROUND OF THE INVENTION

1. Field of the Invention

This invention relates to a control for a gas turbine engine, and particularly to an emergency or backup control for the rear compressor vanes of the engine. During normal operation the position of the vanes is controlled by a primary closed loop control system in response to selected engine operating conditions such as compressor rotor speed and fan discharge total temperature. Should a failure occur in the primary control system, the position of the vanes is locked or moves to an extreme value, and the engine may become inoperative as a result.

The present invention is directed to an emergency control which is actuated when a failure occurs in the primary control, and which provides an open loop compressor vane control in response to the engine power lever angle. The emergency control may be actuated either manually by the flight crew, or automatically in response to a sensed failure of the primary control. The actuator for positioning the variable compressor vane consists of a hydromechanical unit that will respond to both the primary control or the emergency control, thereby eliminating the need for an additional actuator for the emergency control.

2. Description of the Prior Art

Turbine engines having variable vanes in the compressor section are well known in the art. It is also known that the position of the vanes may be controlled in response to engine or ambient conditions in order to provide optimum aerodynamic operation of the engine. Advanced turbine engines utilize integrated controls which may be electronic or hydromechanical in order to control the many variable elements in the engine including the compressor vanes in a unified manner to provide high performance over the entire engine operating regime.

A major difficulty with present-day engine controls is that failure of the control may cause complete failure of the engine, and in the case of a single engine aircraft, loss of the aircraft. Completely redundant controls would add considerable expense and weight to the aircraft, and are not a practical alternative. The control of compressor vanes is critical to engine operation since there is no one vane position which will provide acceptable engine performance for all operating conditions. Consequently, a failure of the vane control which causes the vanes to become locked in a particular position or to move to an extreme operating condition may be catastrophic, and will at the minimum cause severely degraded operation over much of the engine regime.

To provide at least minimal engine operation if a failure occurs in the primary closed loop control for the variable rear compressor vanes, a simple redundant control is used as an emergency backup. Since it is not necessary during emergency situations to provide the precise control supplied by the primary control system, the emergency control may be open loop, thus eliminating the necessity for feedback from the compressor vanes. Further, the position of the compressor vanes may be scheduled in response to a single input signal such as power lever angle, thereby further reducing the complexity, cost and weight of the emergency controller. As an additional feature, a simple hydromechanical actuator may be used to position the compressor vanes in response to both the primary closed loop control and the emergency open loop control.

SUMMARY OF THE INVENTION

During normal operation the position of the compressor vanes is scheduled by a primary hydromechanical controller in response to selected engine parameters, and a feedback signal of actual compressor vane position nulls the desired position signal. In response to a malfunction in the primary control system, the primary control system is disconnected and the compressor vane position is scheduled in an open loop manner by an emergency controller in response to the engine power lever angle. The emergency controller may be actuated automatically or in response to some action by the pilot. The primary control system regulates the compressor vane position by means of a hydromechanical primary actuator and a slave actuator, while during the emergency mode only the primary actuator is used.

BRIEF DESCRIPTION OF THE DRAWINGS

FIG. 1A is an extension of FIG. 1 which shows in detail the emergency vane controller.

DESCRIPTION OF THE PREFERRED EMBODIMENT

Figure 1:
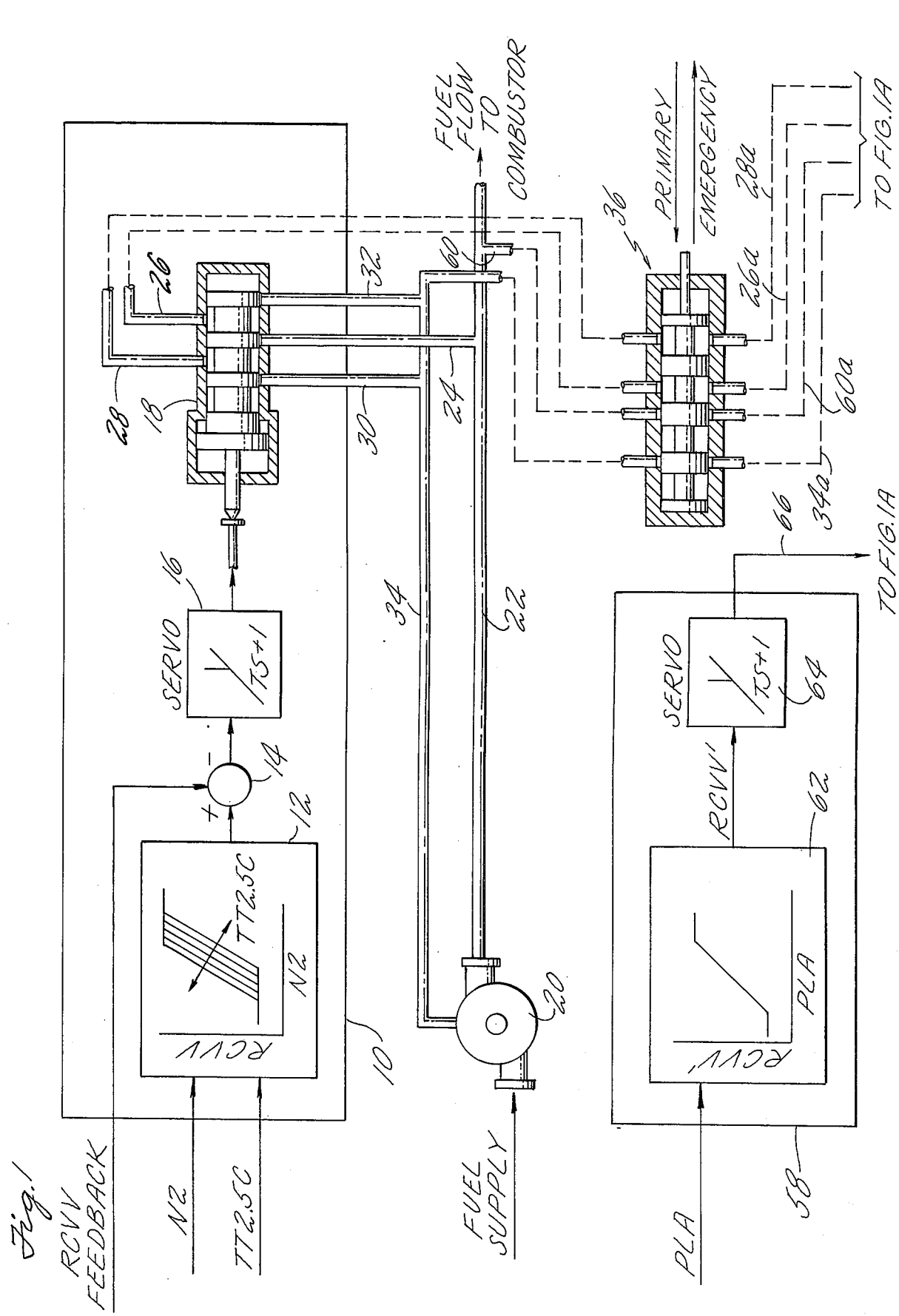
FIG. 1 is a schematic drawing, partially in block diagram form, showing the primary control for the compressor variable vanes.

In illustrating the preferred embodiment of the present invention, the primary control for the rear compressor vanes will be described first, and then the modifications required for the emergency control mode will be described. FIG. 1A is an extension of FIG. 1, and reference should be made to both Figures for a complete illustration of the control.

The primary controller for the rear compressor variable vanes is shown by block 10. The controller 10 may be a portion of a unified control for a turbine engine which includes the engine and augmentor fuel control logic and other engine control functions. As shown the position of the rear compressor variable vanes (RCVV) is scheduled in block 12 in response to engine compressor rotor speed N2 and fan discharge total temperature TT2.5C. Other engine variables may be used to produce the RCVV signal in block 12 depending on the configuration of the engine. The RCVV signal generated in block 12 is equivalent to desired vane position, and is compared at junction 14 with an RCVV feedback signal equivalent to actual vane position, the resultant difference signal being indicative of vane position error. The difference signal is fed to a boost servo 16 which is connected to translate a servo slide valve 18.

A source of fluid which may be the engine fuel supply is pressurized by means of a fuel pump 20 and fed through a high pressure fuel discharge line 22 to the engine combustor. Part of the pressurized fuel is also fed via line 24 to servo valve 18 where it is ported to either of lines 26 or 28 depending on the position of valve 18. Lines 30 and 32 provide a return to low pressure line 34. The operation of a servo of this type is well known and need not be described in detail.

A sleeve valve 36 is connected to lines 26 and 28, the valve 36 being a two position valve which is translated to its extreme left when the primary control is connected to the compressor vanes, and is translated to its extreme right in the emergency control mode. As shown in the drawing the valve 36 is in the primary control position and lines 26 and 28 communicate directly with lines 26a and 28a, the pressurized fuel flowing through lines 26a and 28a to slave actuator 38, and through branch lines 40 and 42 to main actuator 44. Except for the modification to actuator 44 to be described subsequently, the actuators 38 and 44 are standard hydromechanical actuators which are connected through mechanical linkages to adjust the position of compressor vane 46 in response to the position of servo valve 18. Vane 46 is represented in simplified fashion, and in practice a plurality of vanes are moved in unison through a synchronization ring, not shown.

Actuator 44 is a hydromechanical unit which consists of a slide valve 48, a power piston 50 and feedback linkage 52. With sleeve valve 36 in its primary control position, the fluid pressure in lines 26a or 28a, depending on the position of slide valve 18, produces motion of the power piston 50 and motion of the slave actuator 38. Movement of slide valve 18 as a result of position feedback will null the servo pressure to power piston 50 and to slave actuator 38, balancing the system at a steady-state value. In the primary control position of sleeve valve 36, the slide valve 48, feedback linkage 52, cam 54 and cam follower 56 in actuator 44 have no effect on the system since fluid pressure in lines 34a and 60a are shut off by sleeve valve 36. A standard position feedback signal shown at 57 is fed from the output of actuator 44 to primary controller 10 where it is fed into junction 14.

As explained previously, a failure in the primary controller 10 will either lock servo valve 18 in its last position, or cause the valve to translate to an extreme position, causing corresponding positional changes to vanes 46. In either case, engine performance is degraded over at least a portion of its envelope to the point where failure is possible. To avoid engine failure, an emergency controller 58 is used to regulate the position of vanes 46.

Upon detection of a malfunction in the primary control, valve 36 is moved, either manually by the pilot or automatically in response to a detector output signal, from its primary mode position to its emergency mode position, i.e., to the extreme right. In this position lines 26a and 28a are blocked, and line 60a is opened to the high pressure in line 22. Line 34a is also opened to low pressure return line 34.

Emergency controller 58 comprises a schedule block 62 to which is fed a signal indicative of the power lever angle (PLA) of the engine, the output from the block 62 being a signal indicative of desired vane position. The signal from block 62 is fed to a boost servo 64 which in turn actuates a mechanical linkage 66 or other mechanical input to actuator 44.

Actuator 44 has been used previously to modulate the fan inlet guide vanes in a turbofan engine. In this prior application, the input to the actuator was an electrical signal to an integral stepper motor and resolver, the stepper motor converting the electrical signal to a mechanical signal. As the stepper motor rotated it turned the cam 54, and the rotary motion of the cam moved the cam follower 56. The cam follower 56 converted the rotary motion of the cam to translational motion and transmitted the input signal to the slide valve 48. The translational motion of the slide valve ports and dumps servo pressure to the power piston 50 and slave actuator 38 until a steady-state or null position of the actuator slide valve 48 is reached.

In the present application the actuator has been modified in that the stepper motor and resolver have been deleted and replaced by the mechanical linkage 66 which imparts rotary motion to the cam and which may be a flexible cable, torsional cable, pulley cable or rigid mechanical linkage. As described the system provides adequate open loop proportional control of the rear compressor vanes for emergency control operation, and eliminates a feedback requirement for the control. The mechanical input to actuator 44 translates the actuator slide valve 48 during normal operation by the primary control system, but since lines 34a and 60a are shut off by valve 36 in the primary mode, control action occurs only when requested by the primary controller block 10.

It is apparent that a parameter other than power lever angle may be used as an input to the emergency controller 58, this parameter being preferred because of its substantially linear relation to an acceptable compressor vane position for most flight regimes. Other modifications may be made to the preferred embodiment without departing from the scope of the invention as hereinafter claimed.

I claim:

1. In a gas turbine engine, a control for varying the position of the rear compressor vanes comprising
    fluid controlled actuator means connected with said compressor vanes and adapted to vary the position thereof,
    a source of pressurized fluid,
    a first fluid path connecting said fluid source with said actuator means,
    a second fluid path connecting said fluid source with said actuator means,
    a first slide valve connected in both said first and second fluid paths, said first slide valve having a first position which permits passage therethrough of the fluid in said first fluid path only, and having a second position which permits passage therethrough of the fluid in said second fluid path only, said first slide valve normally being in said first position,
    means responsive to selected engine operating conditions for generating a first control signal indicative of desired compressor vane position,
    servo valve means connected in said first fluid path and responsive to said first control signal for regulating the flow of fluid in said first fluid path to thereby vary the position of said compressor vanes when said first slide valve is in said first position,
    means for generating a second control signal indicative of desired compressor vane position,
    and means for connecting said second control signal to said actuator means, said second control signal being adapted to actuate said actuator means and regulate the position of said compressor vanes and regulate the position of said compressor vanes when said first slide valve is moved to said second position.

2. Apparatus as in claim 1 in which said means for generating a first control signal comprises
    means responsive to the speed and temperature of said turbine engine for producing a scheduled compressor vane position signal, feedback means connected with said actuator means for producing a feedback signal indicative of actual compressor vane position, and comparator means for comparing said scheduled compressor vane position signal with said feedback signal.

3. Apparatus as in claim 1 in which said actuator means includes a piston adapted for movement in response to said pressurized fluid and connected at one end to said compressor vanes.

4. Apparatus as in claim 3 in which said actuator means includes a second slide valve, said second control signal being connected to position said second slide valve in response thereto, and means including said second slide valve for controlling the movement of said piston when said first slide valve is in said second position.

5. Apparatus as in claim 1 in which said means for generating said second control signal includes means responsive to the position of the power lever for said turbine engine.

6. Apparatus as in claim 1 in which said actuator means comprises first and second hydromechanical actuators mechanically connected to said compressor vanes and responsive to said pressurized fluid.

* * * * *